(12) United States Patent
Woodson et al.

(10) Patent No.: US 7,142,657 B2
(45) Date of Patent: Nov. 28, 2006

(54) METHOD AND SYSTEM FOR PREVENTING CALL FORWARD LOOPING

(75) Inventors: Charles E. Woodson, Peculiar, MO (US); Baoquan Zhang, Overland Park, KS (US); Thomas M. Sladek, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 354 days.

(21) Appl. No.: 10/259,896

(22) Filed: Sep. 27, 2002

(65) Prior Publication Data

US 2004/0062376 A1    Apr. 1, 2004

(51) Int. Cl.
H04M 3/42 (2006.01)
H04M 7/00 (2006.01)
(52) U.S. Cl. .................. 379/211.02; 379/221.01; 379/211.01; 379/212.01
(58) Field of Classification Search ........... 379/211.02, 379/212.01, 213.01, 221.01, 229
See application file for complete search history.

(56) References Cited

U.S. PATENT DOCUMENTS

| | | | |
|---|---|---|---|
| 3,626,109 A | | 12/1971 | Bartlett et al. |
| 5,018,194 A | | 5/1991 | Suzuki et al. |
| 5,790,638 A | * | 8/1998 | Bertacchi .................. 379/88.26 |
| 5,889,847 A | * | 3/1999 | Copley et al. ............... 379/229 |
| 6,157,640 A | * | 12/2000 | Valentine ..................... 370/384 |
| 6,167,256 A | * | 12/2000 | Yla-Outinen et al. ........ 455/417 |
| 6,324,271 B1 | * | 11/2001 | Sawyer et al. .......... 379/142.05 |
| 6,385,446 B1 | | 5/2002 | Palviainen et al. |
| 6,404,875 B1 | * | 6/2002 | Malik et al. ............ 379/211.03 |
| 6,647,259 B1 | * | 11/2003 | Boyle et al. ................. 455/417 |
| 2001/0023183 A1 | * | 9/2001 | Palviainen et al. .......... 455/417 |
| 2002/0168060 A1 | * | 11/2002 | Huie ...................... 379/211.02 |
| 2002/0168061 A1 | * | 11/2002 | Bruening et al. ....... 379/220.01 |
| 2003/0059018 A1 | * | 3/2003 | Eber et al. .............. 379/211.02 |

* cited by examiner

Primary Examiner—Wing Chan
Assistant Examiner—Aamir Haq

(57) ABSTRACT

In a telecommunications network having switching points (such as SSPs and/or MSCs) controlled by a control point (such as an SCP), the switching points are provisioned to send messages to the control point when they encounter trigger conditions during processing of a call to a called station that has a forward-to number. When the control point receives the messages, it determines whether a loop condition exists, i.e., whether the call has already been forwarded from the forward-to number. If the control point determines that a loop condition exists, the control point instructs the switching point so as not to forward the call to the forward-to number.

21 Claims, 4 Drawing Sheets

METHOD AND SYSTEM FOR PREVENTING CALL FORWARD LOOPING

BACKGROUND

1. Field of the Invention

The present invention relates to telecommunications and, more particularly, to methods and systems for preventing call forward looping.

2. Description of Related Art

Wireless telephone users and landline telephone users are increasingly using enhanced call services, such as call forwarding. Call forwarding enables a user to have incoming calls to a called station forwarded to a forward-to number. The called station may be a mobile station, such as a wireless telephone, or it may be a landline station, such as a landline telephone. The forward-to number may likewise correspond to a mobile station or to a landline station.

Different types of call forwarding are commonly used. For instance, call forwarding may be conditional. In a call forwarding—busy (CFB) feature, calls are forwarded to the forward-to number only if the called station is busy. In a call forwarding—no answer (CFNA) feature, calls are forwarded to the forward-to number only if the called station is not busy but nonetheless does not answer. With CFB and CFNA features, the switching point serving the called station forwards the call to the forwarded-to number typically only after an unsuccessful attempt to terminate the call to the called station.

Alternatively, the call forwarding feature may be unconditional. In a call forwarding—unconditional (CFU) feature, calls to the called station are forwarded to the called number regardless of the status of the called station. With CFU, the switching point serving the called station typically forwards the call to the forward-to number without attempting to terminate the call to the called station.

One potential problem with call forwarding is that endless loops may be created, such as by having two numbers that forward to each other. For example, suppose a user applies a CFNA feature to have calls to his work phone forwarded to his home phone and applies a CFNA feature to have calls from his home phone forwarded to his work phone. Then, a call to the work phone that is unanswered will be forwarded to the home phone. But if the home phone also does not answer the call, then the call will be forwarded back to the work phone, thereby potentially creating an endless loop.

To minimize such call forward looping, telecommunications networks typically allow calls to be forwarded a maximum number of times. One problem with this approach, however, is that a call may be forwarded many number of times without looping, especially as people use more types of telephony devices and use call forwarding more often. For example, a user who is traveling may have calls to his work phone forwarded to his home phone, calls to his home phone forwarded to his mobile phone, and calls to his mobile phone forwarded to a host's phone. As a result, calls to the traveling user may be forwarded three times without looping.

Thus, with the existing approach, if the maximum number of times a call can be forwarded is set too low, some legitimate call forwarding scenarios, like the one described above, may be unavailable. However, if the maximum number is set too high, then call forward looping will not be detected right away, and network resources may be needlessly consumed. Another drawback with the existing approach is that it depends on information regarding the number of times a call has been forwarded to be transmitted reliably, which may be a problem if calls are forwarded from one provider's network to another's. Yet another drawback is that if the maximum number of allowed call forwardings is exceeded existing systems often simply send the call back, without explaining the problem to the caller or the called party.

Accordingly, there is a need to provide more flexible ways to prevent call forward looping.

SUMMARY

In a first principal aspect, an exemplary embodiment of the present invention provides a method of preventing call forward looping in a telecommunications system having at least one switching point controlled by a control point. In accordance with the method, a switching point detects a request to terminate a call, originating from a calling station, to a called station that has a forward-to number. The switching point sends to the control point at least one message identifying the calling station and the called station. The control point determines whether a loop condition exists. If the control determines that a loop condition exists, the control point sends a call treatment message to the switching point. The call treatment message instructs the switching point so as not to forward the call to the forward-to number.

In a second principal aspect, an exemplary embodiment of the present invention provides a system for processing a call to a called station that has a forward-to number. The system comprises: (1) a switching point for terminating the call to the called station and for forwarding the call to the forward-to number; and (2) a control point communicatively coupled to the switching point. The switching point is provisioned with at least one trigger to transmit at least one message when processing the call to the called station. The control point is provisioned with service logic to determine whether a loop condition exists in response to the at least one message and to instruct the switching point so as not to forward the call to the forward-to number if a loop condition is determined to exist.

DETAILED DESCRIPTION OF EXEMPLARY EMBODIMENTS

The present invention, in its preferred embodiments, endeavors to prevent call forward looping by detecting when a loop condition exists. Switching points, such as mobile switching centers (MSCs) and service switching points (SSPs), signal to a call control point, such as a service control point (SCP), when they encounter trigger conditions during processing of an call to a called station that has a forward-to number. In response, the SCP determines whether a loop condition exists, i.e., whether the call has already been forwarded from the forward-to number.

If the SCP determines that a loop condition exists, the SCP instructs the switching point so as not to forward the call to the forward-to number. For example, the SCP may send the switching point a new set of destination digits, which may correspond to the called station's voice mail system. Alternatively, or in addition, the SCP may instruct the switching point to play an announcement to the caller or may instruct the switching point to send the call to a service node to allow for further interaction with the caller. On the other hand, if the SCP determines that a loop condition does not exist, the SCP instructs the switching point so as to continue processing the call, e.g., to forward the call to the forward-to number.

1. Exemplary Architecture

Figure 1:
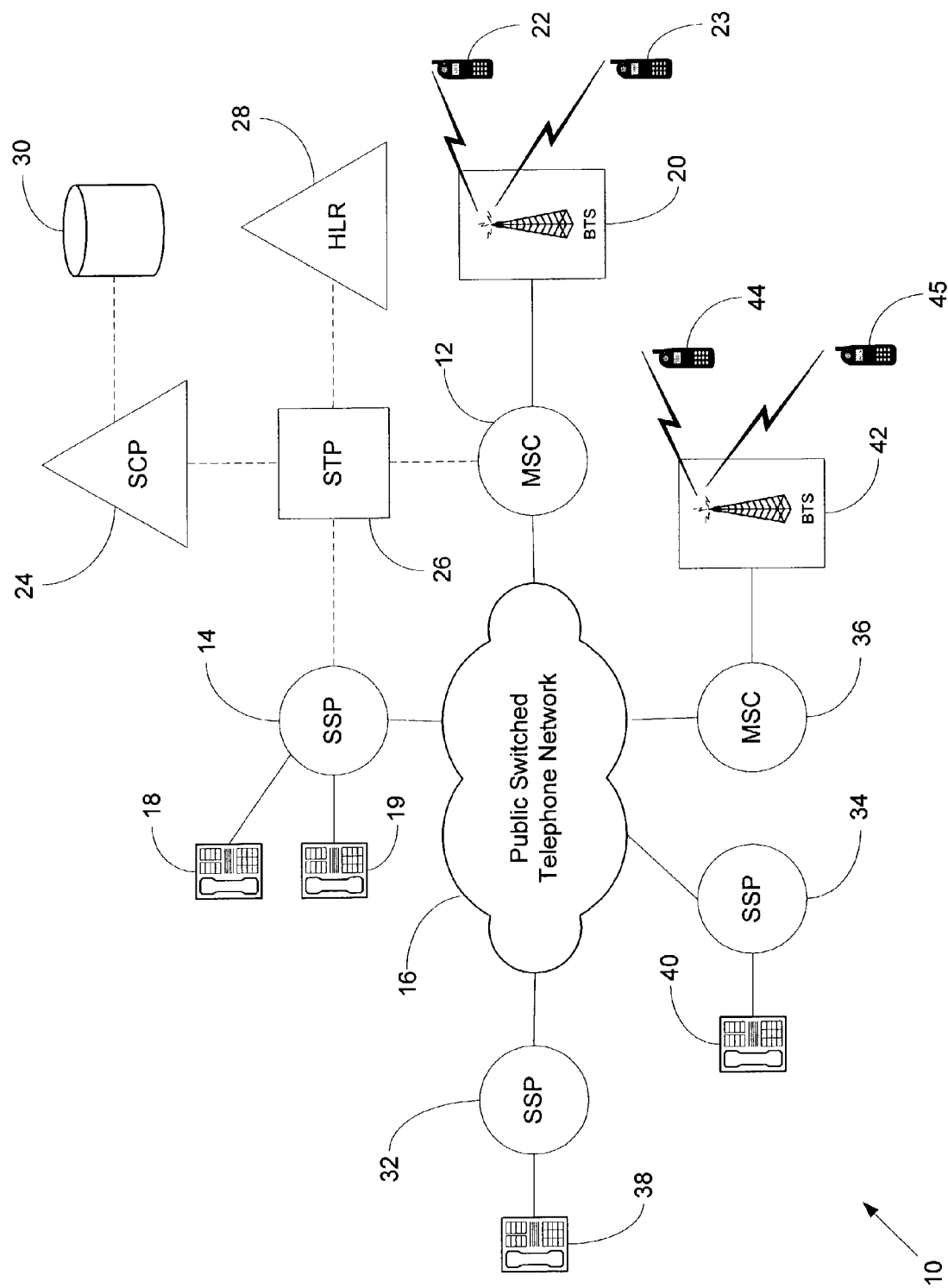
FIG. 1 is a simplified block diagram of a telecommunications system, in accordance with an exemplary embodiment of the present invention.

Referring to the drawings, FIG. 1 is a simplified block diagram of an exemplary telecommunications system 10 in which exemplary embodiments of the present invention may be employed. In FIG. 1, dashed lines indicate connections that carry primarily signaling traffic, and solid lines indicates connections that carry primarily bearer traffic, such as voice, data, or other media.

Telecommunications system 10 includes a plurality of switching points, which may include MSCs, such as MSC 12, and/or SSPs, such as SSP 14, connected to the public switched telephone network (PSTN) 16. SSP 14, in turn, may be connected to one or more landline telephony devices, such as landline telephones 18 and 19. MSC 12 may be connected to one or more base transceiver stations (BTSs), such as BTS 20. BTS 20 may communicate over an air interface with one or more wireless devices, such as mobile stations 22 and 23, to provide wireless telecommunications within a wireless coverage area. The communications between BTS 20 and mobile stations 22 and 23 may occur in a digital format, such as CDMA, TDMA, GSM, or 802.11x, or they may occur in an analog format, such as AMPS. In some embodiments, MSC 12 may be connected to BTS 20 via a base station controller (BSC) and/or other networks or systems.

MSC 12 and SSP 14 may use an out-of-band signaling system, such as Signaling System 7 (SS7), to send and receive calls through PSTN 16. SSP 14 may use the advanced intelligent network (AIN) approach of having much of the call processing logic provisioned in a central control point, such as an SCP, rather than in the switch itself. Thus, when SSP 14 encounters predefined "trigger points" during call processing, it signals SCP 24 for instructions. The signals from SSP 14, which may be provided as SS7 Transaction Capabilities Application Part (TCAP) invoke messages, pass a set of relevant parameters to SCP 24. When SCP 24 receives a TCAP invoke message, it may execute appropriate service logic and consult appropriate data records to obtain the information and instructions needed to respond. SCP 24 may then send a TCAP response message to SSP 14 instructing it how to process the call. The signaling between SSP 14 and SCP 24 may be routed through one or more signal transfer points (STPs), such as STP 26.

MSC 12 may also follow an intelligent network approach. In particular, MSC 12 may exchange TCAP messages with SCP 24, such as in accordance with the specification "Wireless Intelligent Network," TIA/EIA/IS-771, published in July 1999, which is incorporated herein by reference. Other signaling protocols could be used, however. MSC 12 may also be exchange signals with a home location register (HLR) 28, which signaling may conform to IS-41 specifications. A recent revision of the IS-41 specifications, ANSI/TIA/EIA-41-D-97, published in December 1997, is incorporated herein by reference.

As described in more detail below, SCP 24 may have access to data records stored in data storage 30. Data storage 30 may be external to SCP 24, or it may be wholly or partially internal to SCP 24. Data storage 30 may include volatile data storage, such random access memory (RAM), and/or non-volatile data storage, such as read-only memory (ROM), magnetically encoded tape, magnetically encoded disk, or optically encoded disk.

Although FIG. 1 shows only MSC 12 and SSP 14 controlled by SCP 24, in general SCP 24 may control a plurality of MSCs and/or SSPs. PSTN 16 may also be connected to other switching points, such as SSP 32, SSP 34, and MSC 36, that do not signal to SCP 24. Instead, switching points 32, 34, and 36 may exchange messages with a different control point, or they may not use the intelligent network approach for call processing at all. SSPs 32 and 34 may each be connected to one or more landline telephony devices, such as landline telephones 38 and 40, respectively. MSC 36 may be connected to one or more BTSs, such as BTS 42. BTS 42, in turn, is able to communicate over an air interface with one or more wireless devices, such as mobile stations 44 and 45. Switching points 32, 34, and 36 may also use SS7 to send and receive calls through PSTN 16.

Each of mobile stations 22, 23, 44, and 45 may be associated with a home MSC. For example, each of mobile stations 22, 23, 44, and 45 may have a mobile directory number (MDN) that corresponds to a directory number allocated to the mobile station's home MSC. Such mobile stations are typically able to operate in the wireless coverage areas served by their home MSCs, and they are also typically able to "roam," i.e., to operate in wireless coverage areas served by MSCs other than their home MSCs. In the examples described herein, mobile stations 22 and 44 have MSC 36 has their home MSC, and mobile stations 23 and 45 have MSC 12 as their home MSC. Thus, in these examples, mobile stations 22 and 45 are roaming, while mobile stations 23 and 44 are not.

2. Messaging From The Switching Points

In an exemplary embodiment, the switching points that exchange messages with SCP 24, e.g., MSC 12 and SSP 14, are provisioned with triggers so that they send one or more messages to SCP 24 during call processing to enable SCP 24 to determine if a call forward loop condition exists. These one or more messages may, for example, include pre-termination messages, i.e., messages sent before the switching point attempts to terminate the call to the called station, and/or termination failure messages, i.e., messages sent after a failed attempt to terminate the call to the called station. More particularly, MSC 12 may be provisioned with the following WIN (IS-771) triggers: Advanced_Termination, T_Busy, and T_NoAnswer. SSP 14 may be provisioned with similar AIN triggers.

The Advanced_Termination trigger occurs after the switching point detects a request to terminate an incoming call to a called station but before the switching point attempts to terminate the call to the called station. When the switching point encounters an Advanced_Termination trigger, it sends the SCP an Analyzed Info invoke message. The Analyzed_Info invoke message preferably includes the following parameters: calling party number, called party number (i.e., the called station's number), redirecting number (i.e., the number forwarding the call to the called station, if any), and, if the called station is a mobile station, the mobile station's mobile identification number (MIN).

The T_Busy trigger occurs when the switching point attempts to terminate the incoming call to the called station but is unable to do so because the called station is busy. When the switching point encounters a T_Busy trigger, it sends the SCP a T_Busy invoke message. Analogously, the T_NoAnswer trigger occurs when the switching point attempts to terminate the incoming call to the called station but is unable to do so because the called station does not answer. When the switching point encounters a T_NoAnswer trigger, it sends the SCP a T_NoAnswer invoke message. The T_Busy and T_NoAnswer invoke messages preferably include the calling party number, called party number (i.e., the called station number), redirecting number (if any), and MIN (if applicable).

The switching point may obtain the information to include in the Analyzed_Info, T_Busy, and T_NoAnswer messages from the SS7 Integrated Services User Part Initial Address Message (ISUP-IAM) message that routed the incoming call to the switching point. In particular, an ISUP-IAM message normally includes the calling party number and the called party number. If the call has already been forwarded, the ISUP-IAM message may also include the original called number. If the call has been forwarded at least twice, then the ISUP-IAM message may also include a redirecting number, which corresponds to the number that most recently forwarded the call.

If the ISUP-IAM message includes a redirecting number (i.e., the call has been forwarded at least twice), then the switching point preferably uses this redirecting number for the redirecting number parameter in Analyzed_info, T_Busy, and T_NoAnswer messages. If the ISUP-IAM messages does not include a redirecting number but still includes an original called number (i.e., the call has been forwarded only once), then the switching point preferably uses the original called number for the redirecting number parameter. If the ISUP-IAM message does not include either a redirecting number or an original called number, then the switching point preferably does not include a redirecting number parameter.

However, the mere fact that an Analyzed_info, T_Busy, or T_NoAnswer invoke message does not include a redirecting number does not necessarily indicate that the call was not forwarded. For example, the original called number and redirecting number parameters are optional in ISUP-IAM messages. As a result, some networks may not include these parameters in ISUP-IAM messages even though the called is, in fact, forwarded. As another example, when a call is forwarded from one station to another station that is served by the same switching point, then, in many cases, no ISUP-IAM messages are generated at all.

3. SCP Operation In Response To The Messaging

When the SCP receives an Analyzed_Info invoke message from a switching point, the SCP obtains the forward-to number of the called station and may also determine what type of call forwarding service (e.g., CFU, CFB, or CFNA) applies. In some cases, this call forwarding information may already be provisioned in the SCP. In other cases, the call forwarding may be provisioned in the HLR instead, in which case the SCP may obtain the call forwarding information by sending an IS-41 SEARCH query to the HLR.

The SCP may then determine whether a loop condition exists. In some cases, the SCP may be able to detect a loop condition by analyzing the call forwarding information it obtained for the called station and the parameters of the Analyzed_Info invoke. For example, if the called station has a CFU feature and the called station's forward-to number corresponds to the redirecting number in the Analyzed_Info invoke, then a loop condition exists. The SCP would then send the switching point an Analyzed_Info return result message instructing the switching point so as not to forward the call to the forward-to number.

In other cases, the SCP may search a plurality of call forwarding records to determine whether the call has already been forwarded. Each call forwarding record preferably identifies the calling party, the called station's number, the number to which the call was forwarded, and a timestamp indicating when the call was forwarded. Thus, the existence of a call forwarding record with the same calling party and a timestamp sufficiently close in time, i.e., within a predetermined time period, indicates that the call has already been forwarded at least once. Alternatively, a particular call from a particular caller station may be associated with a unique call identifier. The SCP may generate the call forwarding records, as described in more detail below.

The SCP may search the database of call forwarding records because, as noted above, the Analyzed_Info invoke message might not include all of the information regarding the number(s), if any, that previously forwarded the call. Thus, the SCP may use the information contained in the call forwarding records to supplement the information contained in the Analyzed_Info invoke message. For example, the Analyzed_Invoke message might not include any redirecting number, even though the call has been forwarded, but the SCP may still be able to determine the number forwarding the call from the call forwarding records.

In response to the Analyzed_Info invoke message, the SCP may use the information contained in the call forwarding records in the following ways. If a CFU feature applies and the call forwarding records indicate that the called station has already forwarded the call or that a number corresponding to the forward-to number has already forwarded the call, then a loop condition exists. If a CFB or CFNA feature applies and the call forwarding records indicate that the called station has already forwarded the call, then a loop condition exists.

If a loop condition exists, the SCP sends the switching point an Analyzed_Info return result instructing the switching point so as not to forward the call to the forward-to number. The Analyzed_Info return result may instead instruct the switching point to send the call to an alternate destination, such as a voice mail system. If a loop condition does not exist, then SCP sends the switching point an Analyzed_Info return result instructing the switching point so as to continue call processing.

To continue call processing when a CFU feature applies, the switching point forwards the call to the forward-to number. To continue call processing when a CFB or CFNA feature applies, the switching point attempts to terminate the call to the called station. Then, if the called station is busy and a CFB feature applies, the switching point encounters a T_Busy trigger and sends a T_Busy invoke message to the SCP. Similarly, if the called station does not answer and a CFNA feature applies, the switching point encounters a T_NoAnswer trigger and sends a T_NoAnswer invoke message to the SCP.

The SCP may also determine whether a loop condition exists in response to T_Busy and T_NoAnswer invoke messages from the switching point. In particular, if the T_Busy or T_NoAnswer invoke includes a redirecting number that correspond to the forward-to number, then a loop condition exists. If the T_Busy or T_NoAnswer invoke does not include a redirecting number, the SCP may nonetheless determine from the call forwarding records that the forward-to number has already forwarded, thereby indicating a loop condition.

If a loop condition exists, the SCP sends the switching point a T_Busy or T_NoAnswer return result instructing the switching point so as not to forward the call to the forward-to number. The return result may instead instruct the switching point to send the call to an alternate destination, such as a voice mail system. If a loop condition does not exist, then SCP sends the switching point a return result instructing the switching point so as to continue call processing. The switching point would then responsively forward the call to the forward-to number.

The SCP may also generate the call forwarding records described above. The SCP preferably generates a call forwarding record when the SCP determines that the switching point may forward the call without looping. Thus, if a CFU feature applies, the SCP may generate the call forwarding record when it sends an Analyzed_Info return result instructing the switching point to continue call processing. If a CFB or CFNA feature applies, the SCP may generate the call forwarding record when it sends a T_Busy or T_NoAnswer return result instructing the switching point to continue call processing. As indicated above, the call forwarding record preferably includes the calling party number, the called station's number (i.e., a directory number and/or MIN), the forward-to number (which may be a directory number and/or MIN), and a timestamp. The SCP may store the call forwarding record in data storage.

4. Call Forwarding Examples

Three different examples illustrating how the present invention may prevent call forward looping are given below. In these examples, station A has a CFB or CFNA feature with a forward-to number corresponding to station B. Station B also has a CFB or CFNA feature and has a forward-to number corresponding to station A. In the first two examples, stations A and B are associated with separate switching points, switches A and B, of which only switch B signals to SCP 24. In particular, switch A may signal to a different SCP or may not signal to any control point at all. In the third example, stations A and B are associated with the same switching point, switch C, which signals to SCP 24.

a. Stations A and B are Associated with Different Switches, Station A is Called

Figure 2:
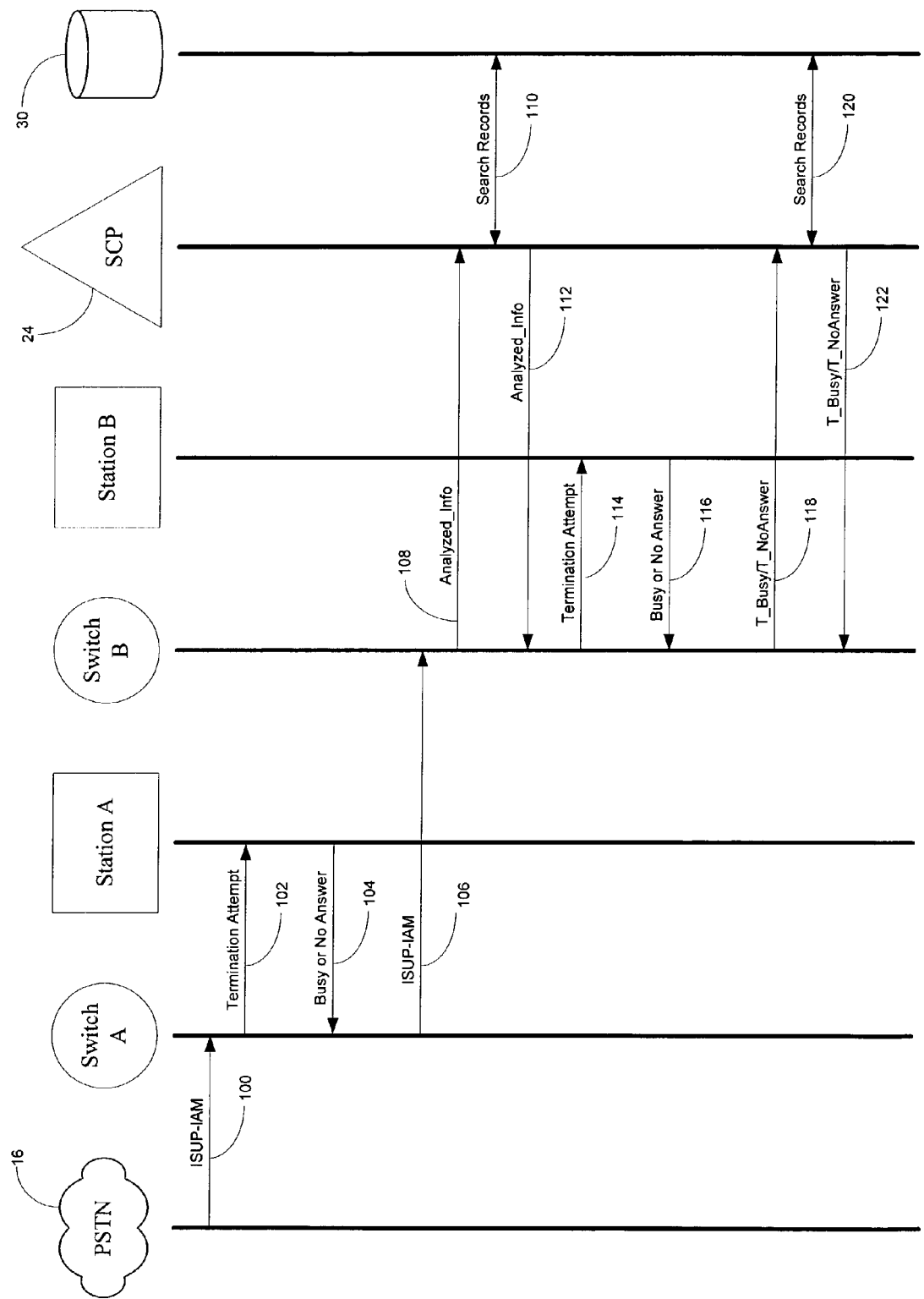
FIG. 2 is a simplified call flow diagram, in accordance with an exemplary embodiment of the present invention.

In the first example, a calling party calls station A, associated with switch A. FIG. 2 is a simplified call flow diagram for this example. The calling party may, for example, be using landline telephone 38 connected to SSP 32. Alternatively, the calling party may be using a mobile station associated with an MSC, or the calling party may be using voice over IP (VOIP) or some other means to call station A via PSTN 16. Switch A may correspond to an SSP that does not signal to SCP 24, such as SSP 34. In that case, station A may correspond to a telephony device connected to SSP 34, such as landline telephone 40. Alternatively, switch A may correspond to an MSC that does not signal to SCP 24, such as MSC 36. In that case, station A may correspond to a mobile station that has MSC 36 as its home MSC, such as mobile station 22 or 44. Switch B, however, signals SCP 24. Thus, switch B may correspond to SSP 14, in which case station B may correspond to a telephony device connected to SSP 14, such as landline telephone 18. Alternatively, switch B may correspond to MSC 12, in which case station B may correspond to a mobile station that has MSC 12 as its home MSC, such as mobile station 23 or 45.

As shown in FIG. 2, the process may begin when switch A receives an ISUP-IAM message as part of the signaling to set up the call from the calling party through PSTN 16 to station A, as indicated by step 100. In response, switch A attempts to terminate the call to station A, as indicated by step 102. However, switch A is unable to terminate the call to station A because station A is busy or does not answer, as indicated by step 104. In accordance with the CFB/CFNA feature activated for station A, switch A forwards the call to station B by sending an ISUP-IAM message, as indicated by step 106. The ISUP-IAM message of step 106 identifies the calling party, station B as the called party, and station A as the original called number.

Switch B then sends SCP 24 an Analyzed_Info invoke message, as indicated by step 108. The Analyze_Info invoke of step 108 message identifies the calling party, station B as the called party, and station A as the redirecting number. In response, SCP 24 determines, such as by querying HLR 28, that station B has a CFB or CFNA feature and that station B's forward-to number corresponds to station A. SCP 24 also searches the call forwarding records stored in data storage 30, as indicated by step 110, to determine that the call has not previously been sent to station B. In this case, no loop condition yet exists because switch B has not yet attempted to terminate the call to station B and, thus, station B has not had a chance to answer the call. As a result, SCP 24 sends switch B an Analyzed_Info return result instructing switch B so as to continue processing the call, as indicated by step 112.

Switch B continues processing the call by attempting to terminate the call to station B, as indicated by step 114. In this case, station B is busy or does not answer, as indicated by step 116. As a result, switch B sends a T_Busy or T_NoAnswer invoke message to SCP 24, as indicated by step 118. The message of step 118 identifies the calling party, station B as the called party, and station A as the redirecting number.

SCP 24 then determines that a loop condition exists because station B's forward-to number corresponds to station A, but station A has already forwarded the call to station B. To make this determination, SCP 24 may search the call forwarding records stored in data storage 30, as indicated by step 120. SCP 24 sends switch B a T_Busy or T_NoAnswer return result instructing switch B so as not to forward the call to switch A, as indicated by step 122. In particular, the message of step 122 may instruct switch B to send the call to an alternate destination, such as a voice mailbox associated with station B.

b. Stations A and B are Associated with Different Switches, Station B is Called

Figure 3:
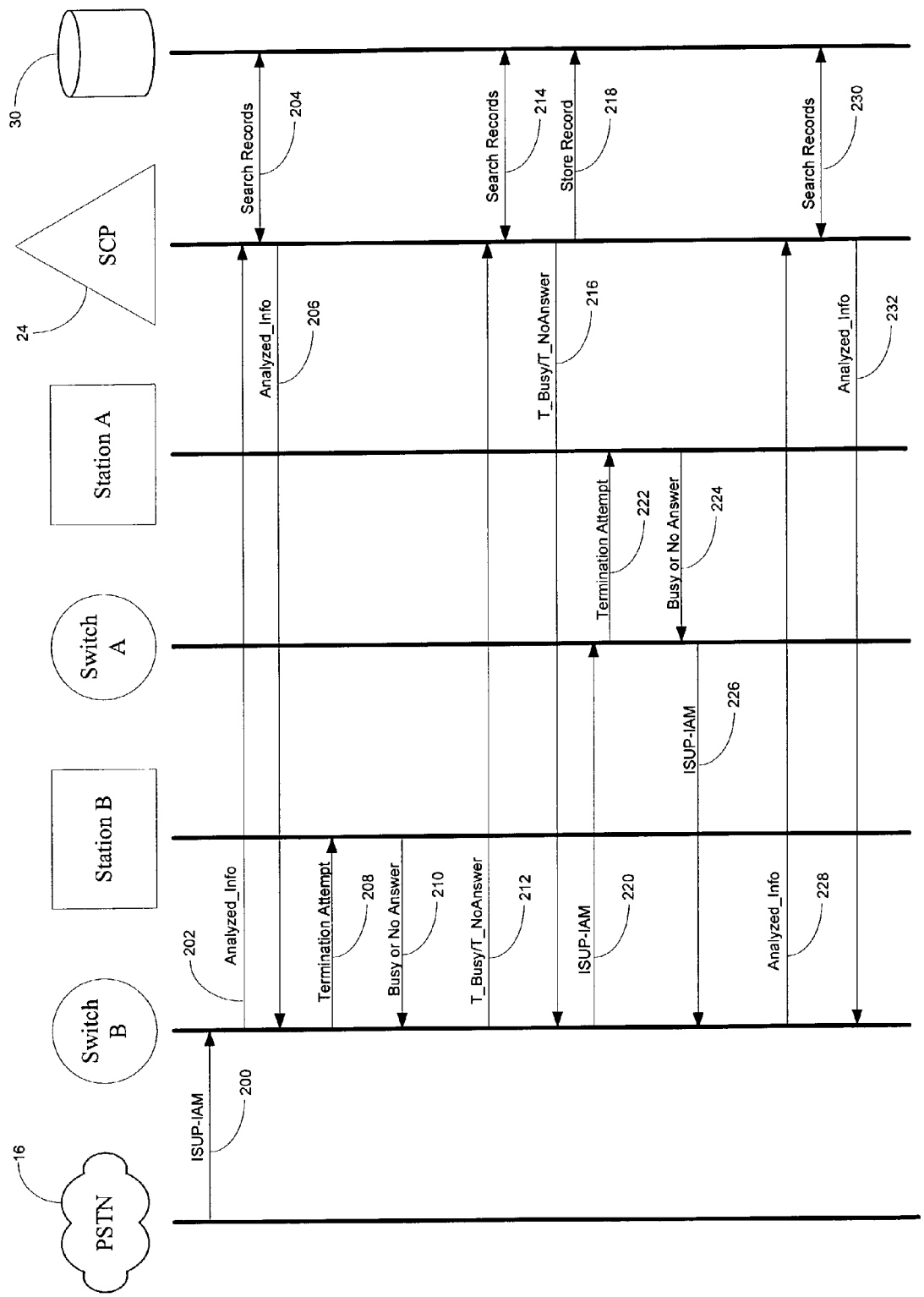
FIG. 3 is a simplified call flow diagram, in accordance with an exemplary embodiment of the present invention.

In the second example, a calling party calls station B, associated with switch B. FIG. 3 is a simplified call flow diagram for this example. The calling party, switch A, switch B, station A, and station B, may correspond to network elements as described above with respect to FIG. 2.

As shown in FIG. 3, the process may begin when switch B receives an ISUP-IAM message to route the call from the calling party though PSTN 16 to station B, as indicated by step 200. In response, switch B responsively sends SCP 24 an Analyzed_Info invoke message identifying the calling party and station B as the called party, as indicated by step 202. SCP 24 then determines that station B has a CFB/CFNA feature and that station B's forward-to number corresponds to station A. SCP 24 also searches the call forwarding records stored in data storage 30, as indicated by step 204, to determine that the call has not previously been sent to station B. Thus, no loop condition yet exists because switch B has not yet attempted to terminate the call to station B and station B, thus, has not had a chance to answer the call. Accordingly, SCP 24 sends switch B an Analyzed_Info return result instructing switch B so as to continue processing the call, as indicated by step 206.

To continue processing the call, switch B attempts to terminate the call to station B, as indicated by step 208. In this case, station B is busy or does not answer, as indicated by step 210. In response, switch B sends a T_Busy or T_NoAnswer invoke message to SCP 24 identifying the calling party and station B as the called party, as indicated by step 212. In response, SCP 24 determines whether a loop condition exists by analyzing the invoke message of step 212 and by searching data storage 30, as indicated by step 214, for call forwarding records whose timestamps are within a predetermined period of time. In this case, there is no redirecting number and no record that the call has been previously forwarded. Therefore, SCP 24 determines that no loop condition exists and sends switch B a T_Busy or T_NoAnswer return result instructing switch B so as to continue processing the call, as indicated by step 216. SCP 24 also generates a timestamped call forwarding record indicating that station B forwarded a call from the calling party to station A, and SCP 24 stores the call forwarding record in data storage 30, as indicated by step 218.

Switch B continues processing the call, i.e., to forward the call to station A, by sending an ISUP-IAM message to switch A, as indicated by step 220. Switch A attempts to terminate the call to station A, as indicated by step 222, but station A is busy or does not answer the call, as indicated by step 224. As a result, switch A forwards the call to station B, by sending an ISUP-IAM message to switch B, as indicated by step 226. The ISUP-IAM message of step 226 identifies the calling party, station B as the called party, station B as the original called number, and station A as the redirecting number. In response, switch B sends SCP 24 an Analyzed_Info invoke message identifying the calling party, station B as the called number, and station A as the redirecting number, as indicated by step 228.

SCP 24 then determines whether a loop condition exists by analyzing the Analyzed_info invoke message of 228 and by searching data storage 30 for call forwarding records whose timestamps are within a predetermined time period, as indicated by step 230. In this case, SCP 24 determines that a loop condition exists, based on the call forwarding record stored in step 218, which shows that station B has already forwarded the call to station A. Accordingly, SCP 24 sends switch B an Analyzed_Info return result instructing switch B so as not to forward the call, as indicated by step 232. More particularly, the message of step 232 may instruct switch B to send the call to an alternate destination, such as a voice mailbox associated with station B.

c. Stations A and B are Associated With the Same Switch, Station A is Called

Figure 4:
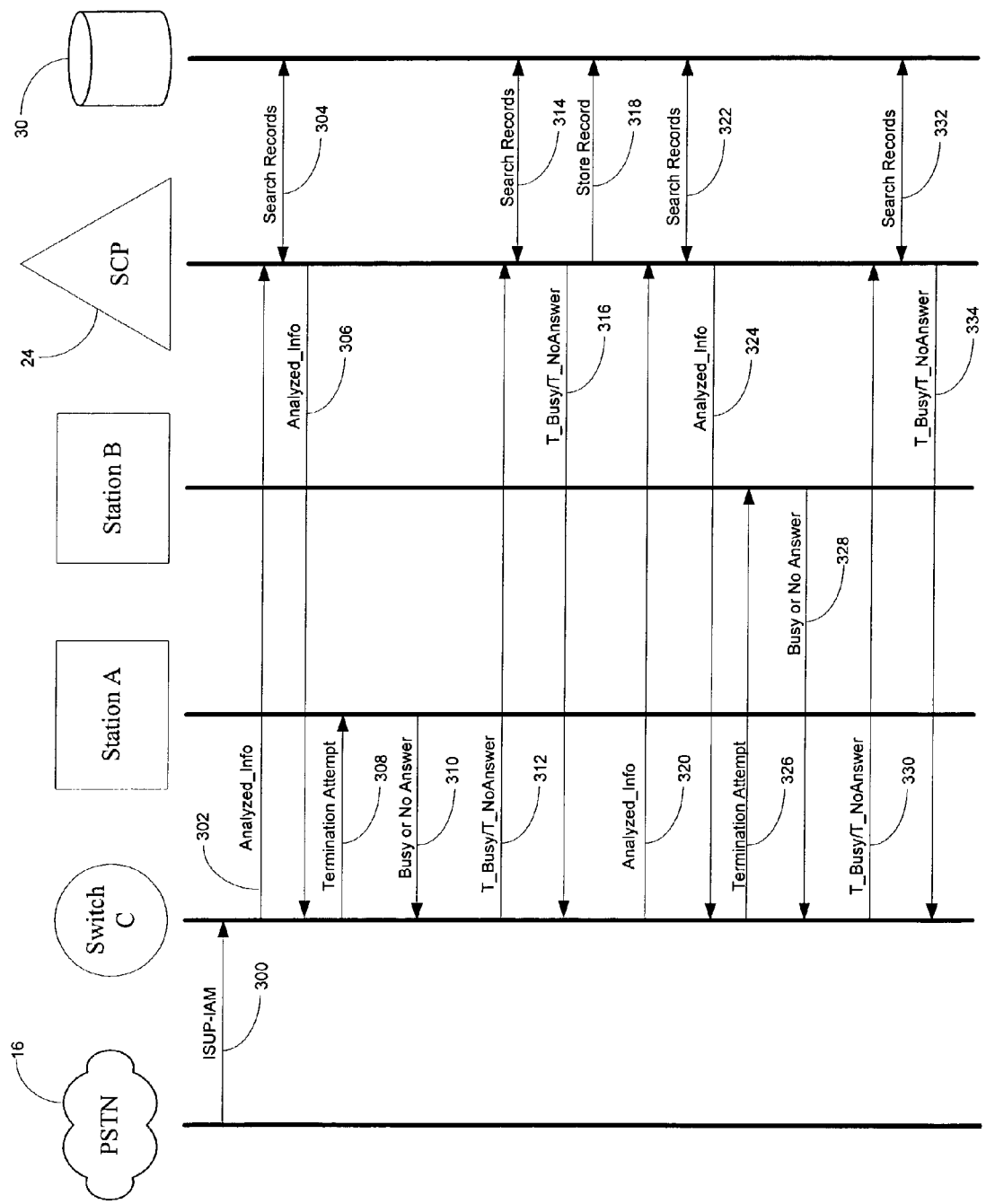
FIG. 4 is a simplified call flow diagram, in accordance with an exemplary embodiment of the present invention.

In the third example, a calling party calls station A, which has a forward-to number corresponding to station B, and stations A and B are both associated with switch C. FIG. 4 is a simplified call flow diagram for this example. Switch C may be an SSP that signals to SCP 24, such as SSP 14. In that case, stations A and B may correspond landline telephony devices connected to SSP 14, such as landline telephones 18 and 19. Alternatively, switch C may be an MSC that signals to SCP 24, such as MSC 12. In that case, stations A and B may correspond to mobile stations that have MSC 12 as their home MSC, such as mobile stations 23 and 45.

As shown in FIG. 4, the process may begin when switch C receives an ISUP-IAM message to route the call from the calling party though PSTN 16 to station A, as indicated by step 300. In response, switch C sends SCP 24 an Analyzed_Info invoke message as indicated by step 302. SCP 24 determines that no loop condition exists, because there is no redirecting number in the message of step 302 and there is no call forwarding record for this call, after searching data storage 30, as indicated by step 304. Accordingly, SCP 24 sends switch C an Analyzed_Info return result instructing it to continue processing the call, as indicated by step 306.

In response, switch C attempts to terminate the call to station A, as indicated by step 308. In this case, station A is busy or does not answer, as indicated by step 310. As a result, switch C sends a T_Busy or T_NoAnswer invoke to SCP 24, as indicated by step 312. In response, SCP 24 determines that station A has a CFB/CFNA feature and that its forward-to number corresponds to station B. After searching the call forwarding records in data storage 30, as indicated by step 314, SCP 24 determines that no loop condition exists, because there is no redirecting number in the invoke message from the switch, and there is no call forwarding record for this call. Accordingly, SCP 24 sends switch C a T_Busy or T_NoAnswer return result instructing switch C to continue processing the call, as indicated by step 316. SCP 24 also generates a timestamped call forwarding record indicating that station A forwarded a call from the calling party to station B. SCP 24 stores this call forwarding record in data storage 30, as indicated by step 318.

Before attempting to terminate the call to station B, switch C sends SCP 24 another Analyzed_Info invoke message, as indicated by step 320. The message of step 320 identifies the calling party and station B as the called party, but it does not include a redirecting number because ISUP messaging was not used to forward the call. In response, SCP 24 determines that station B has a CFB/CFNA feature and that its forward-to number corresponds to station A. SCP 24 then determine whether a loop condition exists by analyzing the Analyzed_Info invoke message of step 320 and by searching data storage 30 for any call forwarding records timestamped within a certain period of time, as indicated by step 322. SCP 24 determines that no loop condition exists because station B has not yet had a chance to answer the call. Accordingly, SCP 24 sends switch C an Analyzed_Info return result that instructs it to continue processing the call, as indicated by step 324.

In response, the switch attempts to terminate the call to station B, as indicated by step 326. In this case, station B is busy or does not answer, as indicated by step 328. In response, switch C sends SCP 24 a T_Busy or T_NoAnswer invoke message, as indicated by step 330. The message of step 330 identifies the calling party and station B as the called party, but it does not include redirecting number. To determine whether a loop condition exists, SCP 24 analyzes the T_Busy or T_NoAnswer invoke message of step 330 and searches data storage 30 for any call forwarding records timestamped within a certain period of time, as indicated by step 332. This time SCP 24 determines that a loop condition exists, based on the call forwarding record stored in step 318 indicating that station A, which corresponds to station B's forward-to number, has already forwarded the call. Accordingly, SCP 24 sends a T_Busy or T_NoAnswer return result message instructing switch C so as not to forward the call, as indicated by step 334. For example, the message of step 334 may instruct switch C to send the call to an alternate destination, such as a voice mailbox associated with station A or station B.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method of preventing call forward looping in a telecommunications system having a plurality of switching points controlled by a control point, said method comprising:
 a switching point detecting a request to terminate a call to a called station, said called station having a forward-to number, said call originating from a calling station;
 said switching point sending at least one message to said control point, said at least one message identifying said calling station and said called station;
 said control point determining whether a loop condition exists, wherein determining whether a loop condition exists comprises searching a plurality of call forwarding records to determine whether said forward-to number has already forwarded said call; and
 if said control point determines that a loop condition exists, said control point sending a first call treatment message to said switching point, said first call treatment message instructing said switching point so as not to forward said call to said forward-to number.

2. The method of claim 1, wherein said first call treatment message instructs said switching point to send said call to an alternate destination.

3. The method of claim 2, wherein said alternate destination is a voice mail system.

4. The method of claim 1, wherein said at least one message includes a pre-termination message, said switching point sending said pre-termination message to said control point before attempting to terminate said call to said called station.

5. The method of claim 4, wherein said pre-termination message identifies said calling station and said called station.

6. The method of claim 4, further comprising:
 in response to said pre-termination message, said control point obtaining said forward-to number and determining what type of call forwarding service applies.

7. The method of claim 1, wherein said at least one message includes a termination failure message, said switching point sending said termination failure message to said control point after unsuccessfully attempting to terminate said call to said called station.

8. The method of claim 7, wherein said termination failure message identifies said calling station and said called station.

9. The method of claim 1, further comprising:
 if said control point determines that a loop condition does not exist, said control point sending a second call treatment message to said switching point, said second call treatment message instructing said switching point so as to continue processing said call.

10. The method of claim 1, further comprising:
 if said control point determines that a loop condition does not exist, said control point generating a new call forwarding record, said new call forwarding record identifying said calling station, said called station, and said forward-to number and including a timestamp; and
 storing said new call forwarding record.

11. The method of claim 1, wherein said switching point is a service switching point (SSP).

12. The method of claim 1, wherein said switching point is a mobile switching center (MSC).

13. The method of claim 1, wherein said control point is a service control point (SCP).

14. The method of claim 1, further comprising:
 said control point obtaining said forward-to number.

15. The method of claim 14, further comprising:
 said control point determining what type of call forwarding service applies.

16. The method of claim 15, wherein said control point obtains said forward-to number and determines what type of call forwarding service applies by querying a home location register (HLR).

17. A system for processing a call to a called station, said called station having a forward-to number, said system comprising:
 a switching point for terminating said call to said called station and for forwarding said call to said forward-to number, said switching point being provisioned with at least one trigger to transmit at least one message when processing said call to said called station; and
 a control point for controlling a plurality of switching points, said control point being provisioned with service logic to determine whether a loop condition exists, by searching a plurality of call forwarding records to determine whether said forward-to number has already forwarded said call, in response to said at least one message and to instruct said switching point so as not to forward said call to said forward-to number if said control point determines that a loop condition exists.

18. The system of claim 17, further comprising:
 data storage containing said plurality of call forwarding records, said data storage being accessible by said control point.

19. The system of claim 17, wherein switching point is a service switching point (SSP).

20. The system of claim 17, wherein said switching point is a mobile switching center (MSC).

21. The method of claim 17, wherein said control point is a service control point (SCP).

* * * * *